United States Patent
Sund

(10) Patent No.: US 9,752,885 B2
(45) Date of Patent: Sep. 5, 2017

(54) TIME-EFFICIENT TRAFFIC ROUTING SYSTEM

(71) Applicant: Alcatel Lucent, Boulogne Billancourt (FR)

(72) Inventor: Matthias Sund, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/767,043

(22) PCT Filed: Feb. 21, 2014

(86) PCT No.: PCT/EP2014/053400
§ 371 (c)(1),
(2) Date: Aug. 11, 2015

(87) PCT Pub. No.: WO2014/154403
PCT Pub. Date: Oct. 2, 2014

(65) Prior Publication Data
US 2016/0003631 A1  Jan. 7, 2016

(30) Foreign Application Priority Data

Mar. 26, 2013  (EP) .................................... 13305370

(51) Int. Cl.
*G01C 21/34* (2006.01)
(52) U.S. Cl.
CPC ........... *G01C 21/343* (2013.01); *G01C 21/34* (2013.01); *G01C 21/3492* (2013.01)
(58) Field of Classification Search
CPC .......................... G01C 21/343; G01C 21/3492
See application file for complete search history.

(56) References Cited

U.S. PATENT DOCUMENTS 6,317,685 B1 * 11/2001 Kozak ................ G01C 21/3407
340/905
6,650,948 B1 * 11/2003 Atkinson ............. G08G 1/0104
340/995.13

(Continued)

FOREIGN PATENT DOCUMENTS

CN  1550756  12/2004
CN  1871499  11/2006

(Continued)

OTHER PUBLICATIONS

JPO machine translation of JP 2012-251928 (original JP document published Dec. 20, 2012).*

(Continued)

*Primary Examiner* — Behrang Badii
*Assistant Examiner* — David Testardi
(74) *Attorney, Agent, or Firm* — Patti & Malvone Law Group, LLC

(57) ABSTRACT

An improved vehicle navigation system and method provides a route plan or alternative route based at least in part on evolved state information (e.g., a second traffic state, occurring some time after a first traffic state) from which time-efficiencies may be realized relative to navigation in a previous traffic state. Optionally, the route plan may identify an intermediate destination (e.g., such as a refueling or recharging station) and the schedule may allocate time for customer activities at the intermediate destination.

12 Claims, 4 Drawing Sheets

(56) References Cited

U.S. PATENT DOCUMENTS

| | | | |
|---|---|---|---|
| 8,768,624 B2 * | 7/2014 | Kobayashi | B60L 3/12 701/22 |
| 2004/0249568 A1 * | 12/2004 | Endo | G01C 21/3492 701/410 |
| 2007/0106465 A1 * | 5/2007 | Adam | G01C 21/3492 701/533 |
| 2008/0021632 A1 * | 1/2008 | Amano | G08G 1/096844 701/117 |
| 2009/0265091 A1 * | 10/2009 | Machii | G01C 21/28 701/532 |
| 2010/0286908 A1 * | 11/2010 | Tate, Jr. | G01C 21/3469 701/533 |
| 2011/0166775 A1 * | 7/2011 | Takeuchi | G01C 21/3617 701/533 |
| 2011/0224900 A1 * | 9/2011 | Hiruta | G01C 21/3469 701/533 |
| 2012/0179311 A1 * | 7/2012 | Skaff | B60L 11/1861 701/22 |
| 2012/0179313 A1 * | 7/2012 | Hartl | B60R 16/0236 701/22 |
| 2013/0046457 A1 * | 2/2013 | Pettersson | G01C 21/3469 701/117 |
| 2013/0226441 A1 * | 8/2013 | Horita | B60Q 9/00 701/118 |
| 2013/0226731 A1 * | 8/2013 | MacNeille | G06Q 10/00 705/26.8 |
| 2013/0245944 A1 * | 9/2013 | Rutten | G01C 21/36 701/533 |
| 2014/0121956 A1 * | 5/2014 | Jastrzebski | H01M 10/48 701/123 |

FOREIGN PATENT DOCUMENTS

| | | | | |
|---|---|---|---|---|
| EP | 1106968 | | 6/2001 | |
| EP | 1669719 | | 6/2006 | |
| JP | 2003344074 A | * | 12/2003 | |
| JP | 2007178124 A | * | 7/2007 | |
| JP | 2009174887 A | * | 8/2009 | |
| JP | 2009294233 A | * | 12/2009 | |
| JP | 2010277381 A | * | 12/2010 | |
| JP | 2012208030 A | * | 10/2012 | |
| JP | 2012242296 A | * | 12/2012 | |
| JP | 2012251928 A | * | 12/2012 | |
| WO | WO 2009104244 A1 | * | 8/2009 | ......... G01C 21/3492 |

OTHER PUBLICATIONS

JPO machine translation of JP 2009-174887 (original JP diocument published Aug. 6, 2009).*
JPO machine translation of JP 2007-178124 (original JP document published Jul. 12, 2007).*
Google translation of WO 2009-104244 (original WO document published Aug. 27, 2009).*
Translation of JP 2003-344074A (translated for USPTO by The McElroy Translation Company, Aug. 2008, 27 pages).*
JPO machine translation of JP 2012-242296 (original JP document published Dec. 10, 2012).*
Google Translation of JP 2009-174887 (original JP document published Aug. 6, 2009).*
Google Translation of JP 2012-251928 (original JP document published Dec. 20, 2012).*

* cited by examiner

| SEGMENT | DISTANCE (km) | STATE $S_0$ | |
|---|---|---|---|
| | | AVG. SPEED (km/hr) | HRS TO DRIVE |
| 202 | 11 | 30 | 0.36 |
| 204 | 12 | 30 | 0.4 |
| 206 | 10 | 5 | 2.0 |
| 208 | 13 | 50 | 0.26 |
| 210 | 28 | 40 | 0.7 |
| 212 | 23 | 30 | 0.77 |
| 214 | 20 | 6 | 3.33 |
| 216 | 23 | 3 | 7.67 |

FIG. 4
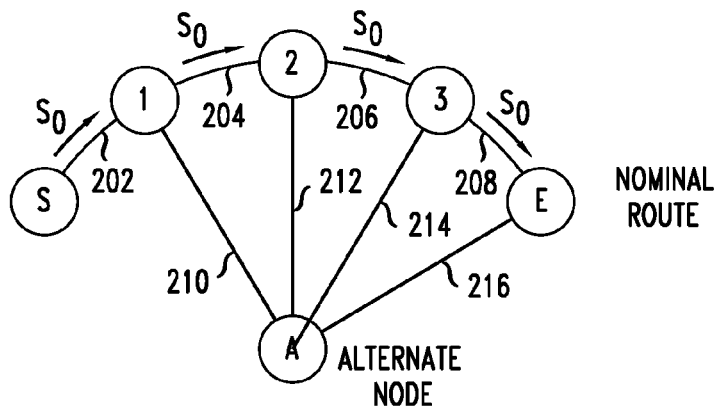
NOMINAL ROUTE
ALTERNATE NODE
FIG. 5
| SEGMENT | DISTANCE (km) | STATE $S_1$ | |
|---|---|---|---|
| | | AVG. SPEED (km/hr) | HRS TO DRIVE |
| 202 | 11 | 50 | 0.22 |
| 204 | 12 | 50 | 0.24 |
| 206 | 10 | 30 | 0.33 |
| 208 | 13 | 50 | 0.26 |
| 210 | 28 | 40 | 0.7 |
| 212 | 23 | 30 | 0.77 |
| 214 | 20 | 50 | 0.4 |
| 216 | 23 | 10 | 2.3 |
FIG. 6
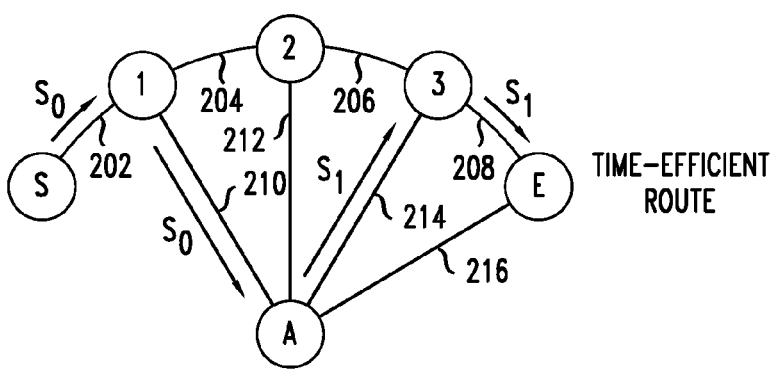
TIME-EFFICIENT ROUTE

TIME-EFFICIENT TRAFFIC ROUTING SYSTEM

FIELD OF THE INVENTION

This invention relates generally to vehicle navigation systems and, more particularly to a navigation feature that identifies a time-efficient route plan for a vehicle.

BACKGROUND OF THE INVENTION

Navigation systems are well known that calculate transportation routes and/or guidance from a current geographical location of a vehicle to a destination. Commonly, navigation systems operate in conjunction with a vehicle positioning system (e.g., without limitation, a GPS-based system) so as to track the location of the vehicle as it advances along the planned route and to redirect the vehicle as needed and/or recalculate an alternate route if it deviates from the planned route. The navigation system commonly includes a display for illustrating maps of the planned route or segments thereof (e.g., without limitation, road or street maps) and the vehicle's position along the planned route or segments. The navigation system may also display speed metrics such as speed limits, distances and/or projected arrival times associated with a route or segments thereof. Still further, the navigation system might also display information on nearby points of interest such as restaurants, fueling or charging stations or the like, including routing and distance information, typically upon customer request.

A problem that arises, is that as a vehicle advances along a planned route, it may encounter delays due to periodic traffic congestion (e.g., rush hour traffic, traffic jams or the like) that the driver may wish to avoid, and which may cause the driver to seek a better, more time-efficient route. A navigation system might inform the vehicle of delays along the planned route or segments thereof and may even redirect the vehicle to an alternative route; however, calculation (or re-calculation, as the case may be) of the route plan is accomplished based on static traffic state information. That is, a navigation system will provide a route plan or alternative route based on traffic conditions observed at a present time or based on nominal speed metrics at a present time (i.e., the time at which the route plan is calculated), but without consideration of traffic conditions projected to occur at a later time. In some instances, particularly those in which traffic conditions characterizing a first traffic state may be expected to evolve to a second, more favorable traffic state after a period of time, it would be advantageous for a navigation system to provide a route plan or alternative route based at least in part on the second traffic state. For example, in instances of rush hour traffic or traffic jams, one may predict that traffic conditions will evolve to a more favorable state in a matter of several minutes, or a few hours, and time-efficiencies may be realized by navigating the vehicle in the more favorable state for at least a portion of a route plan or alternative route. Realization of such time-efficiencies may provide opportunities for arbitrary customer activities (e.g., refueling or recharging of a vehicle) at point(s) of interest along a route plan or alternative route while awaiting traffic conditions to evolve to the second state.

SUMMARY OF THE INVENTION

Generally, embodiments of the present invention describe an improved vehicle navigation system and method that provide a route plan or alternative route based at least in part on evolved state information (e.g., a second traffic state, occurring some time after a first traffic state) from which time-efficiencies may be realized relative to navigation in a previous traffic state.

In one embodiment, there is provided a method, carried out by a processing platform of a vehicle navigation system. The processing platform identifies a plurality of candidate route segments for a vehicle; obtains speed metrics associated with the candidate route segments corresponding to first and second traffic states, wherein the second traffic state is a prospective state occurring after the first traffic state; and identifies a route plan for the vehicle, the route plan defining a route from a first location to a second location comprising one or more selected segments of the candidate route segments, the route plan further defining a schedule for navigating the selected segments, wherein the schedule provides for navigating at least a portion of the selected segments in the second traffic state based on the speed metrics of the second traffic state relative to the first traffic state. Optionally, the route plan may identify an intermediate destination (e.g., such as a refueling or recharging station) and the schedule may allocate time for customer activities at the intermediate destination.

In another embodiment, there is provided an apparatus for providing vehicle navigation services comprising a memory and at least one processor, wherein the processor is configured to identify a plurality of candidate route segments for a vehicle; obtain speed metrics associated with the candidate route segments corresponding to first and second traffic states, wherein the second traffic state is a prospective state occurring after the first traffic state; and identify a route plan for the vehicle, the route plan defining a route from a first location to a second location comprising one or more selected segments of the candidate route segments, the route plan further defining a schedule for navigating the selected segments, wherein the schedule provides for navigating at least a portion of the selected segments in the second traffic state based on the speed metrics of the second traffic state relative to the first traffic state. Optionally, the route plan may identify an intermediate destination (e.g., such as a refueling or recharging station) and the schedule may allocate time for customer activities at the intermediate destination.

BRIEF DESCRIPTION OF THE DRAWINGS

The foregoing and other advantages of the invention will become apparent upon reading the following detailed description and upon reference to the drawings in which:

FIG. 4 is an example representation of a nominal route plan for a vehicle derived based on static traffic state information;

FIG. 5 is a table identifying example speed metrics associated with the candidate route segments of FIG. 2 in a second traffic state ($S_1$);

FIG. 6 is an example representation of a time-efficient route plan for a vehicle derived based on evolved traffic state information.

DESCRIPTION OF THE PREFERRED EMBODIMENT(S)

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
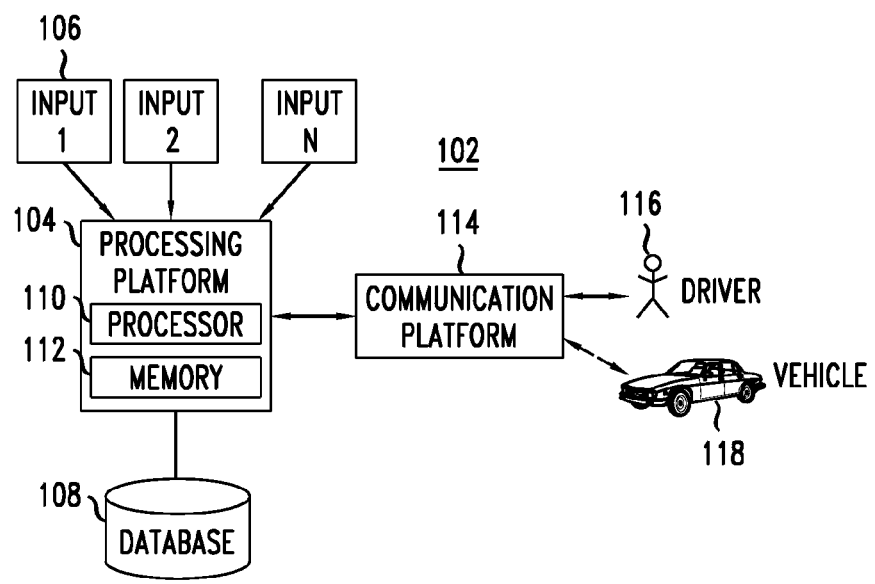
FIG. 1 is a block diagram of a vehicle navigation system according to an exemplary embodiment of the invention.

FIG. 1 illustrates a vehicle navigation system 102 according to embodiments of the invention. As shown, the system 102 comprises a processing platform 104, one or more input platforms 106, a database platform 108 and a communication platform 114 operably connected to a vehicle 118 (and driver 116, if applicable). As will be appreciated, the platforms 104, 106, 108 and 114 are functional elements that may reside in one or more physical devices or structures. According to embodiments of the present invention, the navigation system 102 provides a time-efficient route plan for a vehicle, constructed by the processing platform 104, including identification of selected route segments and a schedule for navigating the segments which is based at least in part on evolved state information relative to a previous traffic state. The route plan may define, for example and without limitation, a sequence of route segments connecting a first location to a second location and the schedule may dictate navigation of a portion of the segments in a first traffic state and a portion of the segments in a second, evolved traffic state from which time-efficiencies may be realized relative to navigation in the first traffic state. A manner of computing a route plan based at least in part on evolved state information will be described in greater detail in relation to FIGS. 5-7.

The processing platform 104 includes a processor 110 and memory 112 for constructing the time-efficient route plan, in cooperation with the input platforms 106, database 108 and communication platform 114. The term "processor" as used herein is intended to include one or more processing devices, including a central processing unit (CPU) or other processing circuitry, including but not limited to one or more signal processors, one or more integrated circuits, and the like. The term "memory" as used herein is intended to include memory associated with a processor or CPU, such as RAM, ROM, a fixed memory device (e.g., hard drive), or a removable memory device (e.g., diskette or CDROM). Generally, the processor 110 is operable to execute software instructions or code stored in the memory 112 for performing the methodologies of embodiments described herein for constructing the route plan.

The input platforms 106 may characterize, for example and without limitation, sensors, antennas, communication terminals, or the like having the ability to access or receive various information relevant to navigation of the vehicle 118 and communicate the information to the processing platform. The database platform 108 may comprise, for example and without limitation, data terminals, memory devices, or the like containing stored information accessible to the processing platform that may be relevant to navigation of the vehicle 118. The received or stored information may include, without limitation: map data (e.g., road or street maps), vehicle positioning data, vehicle control data (e.g., such as vehicle speed, fuel or battery status), route or segment statistics, including speed metrics (e.g., such as speed limits, distances and/or projected transit times associated with a route or segments thereof) and data associated with points of interest (e.g., such as restaurants, fueling or charging stations or the like).

The communication platform 114 communicates information to the vehicle 118 (and driver 116, if applicable) including, for example, display of a planned route or alternative route, map data, vehicle positioning data, driving instructions, route or segment statistics and data associated with points of interest. The communication platform 114 receives information from the vehicle and/or driver such as route plan or alternative route requests, address information (i.e., associated with a destination or intermediate destination) or indicia of points of interest.

In one embodiment, the vehicle navigation system 102 is adapted for use with an electric vehicle 118 that travels via land transport segments (e.g., without limitation, roads, streets, highways, railways). The term "electric vehicle" as used herein is intended to include a vehicle powered at least in part by an electric battery or battery pack, having a navigable range that depends on a charge status of the battery. In such case, the navigation system may identify a route plan or alternative route that identifies a recharging station within the navigable range of the vehicle and allocate time for recharging the vehicle at the recharging station. However, as will be appreciated, the inventive principles described and claimed herein are adaptable to any type of vehicle 118, including landcraft, aircraft, seacraft or spacecraft, characterizing virtually any type of fuel or charging modality and adaptable to any type of transportation segments. As shown, the vehicle 118 is associated with a driver 116 who may request route or alternative route information and follow driving instructions, map data and the like, so as to navigate the vehicle along the planned route or alternative route. However, principles of the invention are adaptable to vehicles 118 that are machine-operated or machine-controlled, either wholly or partially.

Figures 2, 3:
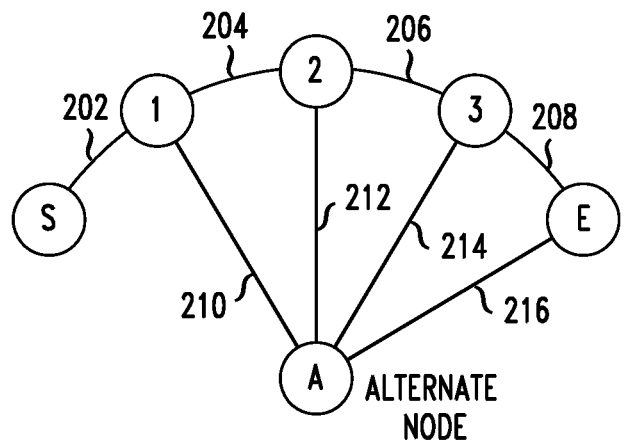
FIG. 2 is an example representation of a plurality of candidate route segments for a vehicle.
FIG. 3 is a table identifying example route segment statistics associated with the candidate route segments of FIG. 2 in a first traffic state ($S_0$)

FIG. 2 shows a generic representation of various nodes interconnected by various route segments. For example and without limitation, the nodes may correspond to cities, towns, landmarks or locations distributed throughout a geographic area; and the route segments may correspond to navigable land transport segments (e.g., roads, streets, highways or the like) that may prospectively be traversed by a vehicle travelling between the various nodes. In the representation shown, the nodes include a starting node ("node S"), which may represent a starting location of a vehicle and an ending node ("node E") that may represent an ending location or final destination of a vehicle. Between the starting and ending nodes are a first node ("node 1"), a second node ("node 2"), a third node ("node 3") and an "alternate" node ("node A"); and between the various nodes are a plurality of prospective route segments 202, 204, 206, 208, 210, 212, 214 and 216. As will be appreciated, the number and/or topology of the nodes and segments may differ depending on the transportation modality, geographic area, or degree of abstraction of map data associated with the geographic area.

FIG. 3 is a table identifying example route segment statistics associated with the candidate route segments of FIG. 2 in a first traffic state ($S_0$). As shown, the route segment statistics include distances and speed metrics (including average transit speed and projected transit times) associated with the prospective route segments 202, 204, 206, 208, 210, 212, 214 and 216 in the first traffic state ($S_0$). The first traffic state ($S_0$) may correspond, for example, to traffic conditions observed at a present time or based on nominal speed metrics at a present time. Generally, it may be noted that the example speed metrics associated with traffic state $S_0$ correspond to relatively slow travel conditions, such as might occur as a result of rush hour traffic or a traffic jam. In particular, in the first traffic state $S_0$: segment 202, having a distance of 11 km, has an average speed of 30 km/hr and a projected transit time of 0.36 hours; segment 204, having a distance of 12 km, has an average speed of 30 km/hr and a projected transit time of 0.4 hours; segment 206, having a distance of 10 km, has an average speed of 5 km/hr and a projected transit time of 2.0 hours; segment 208, having a distance of 13 km, has an average speed of 50 km/hr and a projected transit time of 0.26 hours; segment 210, having a distance of 28 km, has an average speed of 40 km/hr and a projected transit time of 0.7 hours; segment 212, having a distance of 23 km, has an average speed of 30 km/hr and a projected transit time of 0.77 hours; segment 214, having a distance of 20 km, has an average speed of 6 km/hr and a projected transit time of 3.33 hours; and segment 216, having a distance of 23 km, has an average speed of 3 km/hr and a projected transit time of 7.67 hours.

FIG. 4 is an example representation of a nominal route plan for a vehicle derived based on static traffic state information, such as that identified in FIG. 3 associated with traffic state $S_0$. The nominal route plan defines a route that commences from the starting node ("node S") to node 1 via segment 202, from node 1 to node 2 via segment 204, from node 2 to node 3 via segment 206 and from node 3 to the ending node ("node E") via segment 208, all in the first traffic state $S_0$. The projected transit time of the nominal route plan, based on the exemplary speed metrics of FIG. 3, is 3.02 hours (i.e., 0.36+0.4+2.0+0.26).

Now turning to FIG. 5, there is a table identifying example route segment statistics associated with the candidate route segments of FIG. 2 in a second traffic state ($S_1$). As shown, the route segment statistics include distances and speed metrics (including average transit speed and projected transit times) associated with the prospective route segments 202, 204, 206, 208, 210, 212, 214 and 216 in the second traffic state ($S_1$). The second traffic state ($S_1$) may correspond, for example, to traffic conditions predicted to occur at a later time (e.g., occurring several minutes, or a few hours after the first traffic state ($S_0$)). Generally, it may be noted that the example speed metrics associated with traffic state $S_1$ are more favorable than those of traffic state $S_0$, such as may be expected as traffic conditions evolve from rush hour traffic or a traffic jam to less congested traffic conditions. In particular, in the second traffic state $S_1$: segment 202 has a projected speed of 50 km/hr and a projected transit time of 0.22 hours; segment 204 has a projected speed of 50 km/hr and a projected transit time of 0.24 hours; segment 206 has a projected speed of 30 km/hr and a projected transit time of 0.33 hours; segment 208 has a projected speed of 50 km/hr and a projected transit time of 0.26 hours; segment 210 has a projected speed of 40 km/hr and a projected transit time of 0.7 hours; segment 212 has a projected speed of 30 km/hr and a projected transit time of 0.77 hours; segment 214 has a projected speed of 50 km/hr and a projected transit time of 0.4 hours; and segment 216 has a projected speed of 10 km/hr and a projected transit time of 2.3 hours.

According to embodiments of the present invention, the navigation system of FIG. 1 is operable to provide a route plan or alternative route for a vehicle based at least in part on evolved state information, such as that identified in FIG. 5 associated with traffic state $S_1$. As previously noted, the speed metrics associated with example traffic state $S_1$ are generally more favorable than those of example traffic state $S_0$. Accordingly, time-efficiencies may be realized by navigating the vehicle in traffic state $S_1$ for at least a portion of the route plan or alternate route.

FIG. 6 is an example representation of an alternative route for a vehicle based at least in part on evolved state information. In the example of FIG. 6, it is presumed that a vehicle has undertaken a first portion of the route in a first traffic state ($S_0$), such as might occur for a vehicle commencing (initially) according to the nominal route plan of FIG. 4 and deviating from the initial route, such as might occur for a vehicle redirecting to an intermediate destination ("node A") while in the first traffic state. For example and without limitation, a driver of an electric vehicle may request an alternative route to a recharging station in instances where the first traffic state ($S_0$) characterizes rush hour traffic or a traffic jam. The route plan may allocate a period of time for customer activities (e.g., recharging of the vehicle) and to await the second traffic state at the intermediate destination. The route plan may then instruct the vehicle to undertake a second portion of the route, from the intermediate destination to the ending destination, in a second traffic state ($S_1$). Possibly, depending on the length of time spent at node A, the particular route segments defining the first and second portions and the comparative route segment statistics associated with the first and second portions, the time-efficiencies realized by navigating the vehicle in the more favorable traffic state $S_1$ for at least a portion of the alternate route may allow the vehicle to reach its final destination at or near the same time, or earlier, than it would have arrived according to the nominal route plan.

In particular, the alternative route represented in FIG. 6 defines a route having a first portion, undertaken in the first traffic state $S_0$, from the starting node ("node S") to node 1 via segment 202 and from node 1 to node A via segment 210; and a second portion, undertaken in the second traffic state $S_1$, from node A to node 3 via segment 214 and from node 3 to the ending node ("node E") via segment 208. The projected transit time of the first portion, referring to the exemplary speed metrics of segments 202 and 210 in traffic state $S_0$ (shown in FIG. 3) is 1.06 hours (i.e., 0.36+0.7); and the projected transit time of the second portion, referring to the exemplary speed metrics of segments 214 and 208 in traffic state $S_1$ (shown in FIG. 5) is 0.66 hours (i.e., 0.4+0.26). The projected transit time of the alternative route therefore is 1.72 hours (1.06+0.66) plus $\Delta t_A$, where $\Delta t_A$ is the period of time to be spent at node A. Recall that the projected transit time of the nominal route plan (based on static speed metrics according to the first traffic state $S_0$) was 3.02 hours. Thus, $\Delta t_A \le 1.3$ hours will enable the vehicle to reach node E no later than it would have arrived according to the nominal route plan. Alternatively or additionally, the time period for customer activities at node A may be specified by a customer in advance. In one example, a customer coincident to requesting an alternate route to node A may specify a minimum time period at node A. In another example, a customer may specify a maximum time period at node A, or a maximum time duration to reach node E from which a maximum time period at node A may be derived. Optionally, in the latter case, the customer may specify a maximum time duration to reach node E that is greater than the time duration of the nominal route plan.

Figure 7:
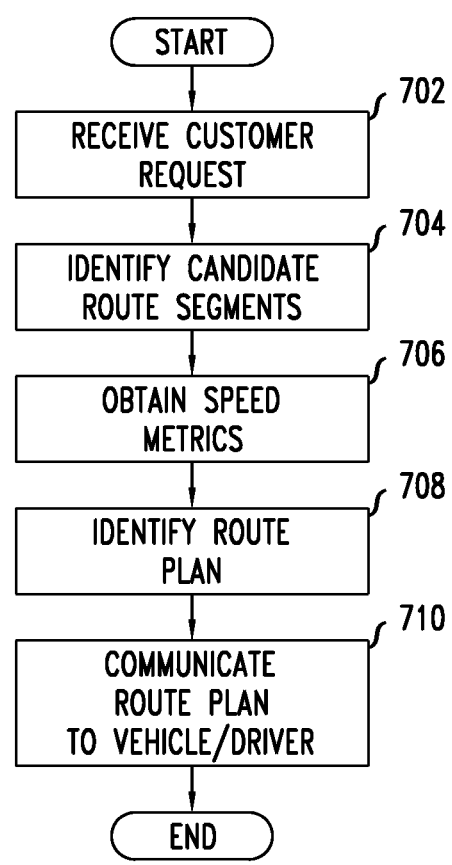
FIG. 7 is a flowchart of steps performed by a processing platform of a vehicle navigation system according to an exemplary embodiment of the invention.

Now turning to FIG. 7, there is shown a flowchart for implementing an improved vehicle navigation system according to embodiments of the invention. The method is implemented, in one embodiment, by a processing platform 104 of a vehicle navigation system 102 such as described in relation to FIG. 1. The steps of FIG. 7 will be described, for convenience, and where appropriate, with reference to the topology of nodes and route segments of FIG. 2, FIG. 4 or FIG. 6, and the route segment statistics shown in FIG. 3 or FIG. 5. As will be appreciated, however, the method is not limited to the particular vehicle navigation system of FIG. 1, the topology shown in FIG. 2, FIG. 4 or FIG. 6 or the route segment statistics shown in FIG. 3 or FIG. 5.

Optionally, at step 702, the vehicle navigation system is implemented responsive to a customer request. For example, with reference to FIG. 1, the driver 116 of vehicle 118 may request a route plan, or the driver 116 while advancing the vehicle 118 along a nominal route plan may request an alternative route plan via the communication platform 114, and the request is communicated to the processing platform 104. The request may specify a starting node, ending node and/or an intermediate destination nodes, and may be supplemented with information from the input platforms 106 such as vehicle positioning data, vehicle control data and/or data associated with points of interest (e.g., such as restaurants, fueling or charging stations or the like) or driver preferences from which possible destination nodes may be derived. As will be appreciated, a customer request may embody any number of different permutations. In one example, a driver requests a route plan or alternative route from a current location (e.g., node "S") to a specified ending node (e.g., node "E"). In another example, a driver in progress along a nominal route plan (e.g., from S to E based on static traffic state information, such as shown in FIG. 4) may initiate a request for an alternative route including a specified alternate node (e.g., node "A") and the processing platform interprets the request as a request for alternate route plan from the previously specified starting node to the ending node by way of the specified alternate node. In yet another example, in the case of an electric vehicle 118 having a battery with a low state of charge, the processing platform may identify a number of nearby charging locations within range of the vehicle and, responsive to driver selection of one of the charging locations (e.g., node "A"), the processing platform interprets the selection as a request for alternate route plan by way of the selected alternate node. It is noted, step 702 is indicated as optional because embodiments of the invention are adaptable to machine-operated or machine-controlled vehicles (i.e., not operated by a human driver) or may be implemented automatically without customer request.

At step 704, the processing platform identifies candidate route segments and nodes for a prospective route plan. For example, for a route plan between a starting node (e.g., node "S") to an ending node (e.g., node "E"), the processing platform identifies one or more candidate route segments and nodes linking S to E (e.g., such as route segments 202, 204, 206, 208, 210, 212, 214 and 216; and nodes 1, 2, 3 and A identified in FIG. 2). The candidate route segments and nodes may be identified in part coincident to a customer request, such as described in relation to step 702 and supplemented or derived independently by the processing platform in cooperation with data from the input platforms 106 and/or database 108. The candidate route segments and nodes may encompass a plurality of potential alternative routes between S and E.

At step 706, the processing platform obtains route segment statistics, including distances and speed metrics associated with the candidate route segments. According to embodiments of the present invention, the statistics include speed metrics associated with at least two traffic states (e.g., $S_0$ and $S_1$), wherein $S_0$ defines a first traffic state and $S_1$ defines a second traffic state predicted to occur at a later time (e.g., occurring several minutes, or a few hours after the first traffic state ($S_0$)). In one embodiment, the speed metrics associated with the second traffic state $S_1$ are more favorable than those of traffic state $S_0$, such as may be expected as traffic conditions evolve from rush hour traffic or a traffic jam to less congested traffic conditions. Example route segment statistics associated with traffic states $S_0$ and $S_1$ are shown in FIG. 3 and FIG. 5, respectively.

At step 708, the processing platform identifies a route plan (or alternative route) for the vehicle from among the candidate route segments and nodes. According to embodiments of the present invention, the route plan or alternative route defines a route from a first location (e.g., node "S") to a second location (e.g., node "E"), based at least in part on evolved state information, such as defined by a second traffic state (e.g., state "$S_1$") relative to a first traffic state (e.g., state "$S_0$"). More particularly, the route plan or alternative route defines a route comprising a sequence of one or more selected segments of the candidate route segments and a schedule for navigating the selected segments, wherein the schedule provides for navigating at least a portion of the selected segments in the second traffic state. In the instance where the speed metrics associated with the second traffic state $S_1$ are generally more favorable than those of the first traffic state $S_0$ (such as is the case with reference to the example statistics shown in FIG. 3 and FIG. 5) time-efficiencies may be realized by navigating the vehicle in traffic state $S_1$ for at least a portion of the route plan or alternate route.

In one embodiment, the step of identifying a route plan or alternative route comprises identifying an intermediate destination for a vehicle. The intermediate destination may comprise an alternate node (e.g., node "A") identified in part coincident to a customer request, such as described in relation to step 702 and supplemented or derived independently by the processing platform in cooperation with data from the input platforms 106 and/or database 108. For example, an alternative route plan for a vehicle including an intermediate destination has been described in relation to FIG. 6. In one embodiment, the processing platform identifies one or more of the candidate route segments, defining a first portion of the route plan, linking the first location to the intermediate destination; identifies one or more of the candidate route segments, defining a second portion of the route plan, linking the intermediate destination to the second location; and identifies a schedule for navigating the first and second portions, wherein the schedule provides for navigating at least the second portion in the second traffic state. For example, with reference to FIG. 6, the processing platform identifies segments 202 and 210, in sequence, linking the first location (e.g., node "S") to node A, defining a first portion of the route plan; and identifies segments 214 and 208, in sequence, linking node A to the second location (e.g., node "E"), defining a second portion of the route plan. The processing platform identifies a schedule that instructs the vehicle to navigate the first portion in the first traffic state $S_0$ and to navigate the second portion in the traffic state $S_1$.

In one embodiment, the step of identifying a schedule comprises identifying a first transit time for navigating the first portion of the route plan in the first traffic state; allocating time for customer activities at the intermediate destination; and identifying a second transit time for navigating the second portion of the route plan in the second traffic state. For example, as previously described with reference to FIG. 6, the processing platform may identify a transit time of 1.06 hours for the first portion and 0.66 hours for the second portion and may allocate $\Delta t_A \leq 1.3$ hours, a time period for arbitrary activities at the intermediate destination that would enable the vehicle to reach node "E" no later than it would have arrived according to the nominal route plan. Alternatively, if the customer has specified a maximum time period at node A, the processing platform may allocate $\Delta t_A$ according to the customer-defined time period; or if the customer has specified a time period to reach node "E" that is greater than the duration of the nominal route plan, the processing platform may derive $\Delta t_A$ based on the customer-defined time period.

Finally, at step 710, the processing platform communicates the route plan or alternative route to the vehicle or driver via the communication platform 114. As will be appreciated, step 710 may include multiple communication exchanges between the communication platform and the vehicle or driver.

The specific exemplary embodiments of the present invention have been described with some aspects simplified or omitted. Those skilled in the art will appreciate variations from these embodiments that fall within the scope of the invention. The described embodiments are to be considered in all respects only as illustrative and not restrictive. The inventive principles described and claimed herein are adaptable to any type of vehicle 118, including landcraft, aircraft, seacraft or spacecraft, characterizing virtually any type of fuel or charging modality and adaptable to any type of transportation segments. Although embodiments have been described with reference to an exemplary route plan including navigation of route segments in a first and second traffic state, wherein the second state is evolved in time relative to the first state, a route plan according to principles of the present invention may be derived and implemented with still further evolved states. For example, a route plan may include traffic segments navigated in first, second, third, fourth, etc. traffic states, each being evolved in time relative to a previous state. The scope of the invention is, therefore, indicated by the appended claims rather than by the foregoing description. All changes that come within the meaning and range of equivalency of the claims are to be embraced within their scope.

What is claimed is:

1. A method, comprising the steps of:
   receiving, at a processing platform of a vehicle navigation system, a request for a route plan from a vehicle operably connected to the vehicle navigation system, wherein the processing platform has a processor and a memory;
   identifying, at the processing platform, a plurality of candidate route segments for the vehicle;
   obtaining, at the processing platform, speed metrics associated with the plurality of candidate route segments corresponding to a first traffic state and a second traffic state, wherein the speed metrics include speed limits and projected transit times associated with the plurality of candidate route segments which are stored in a database, and wherein the second traffic state is a prospective state occurring after the first traffic state;
   identifying, at the processing platform, the route plan for the vehicle, the route plan defining a route from a first location to a second location comprising one or more selected segments of the plurality of candidate route segments, the route plan further defining a schedule for navigating the selected segments, wherein the schedule provides for navigating at least a portion of the selected segments in the second traffic state based on time efficiencies realized from the speed metrics of the second traffic state relative to the first traffic state;
   identifying, at the processing platform, a route segment that identifies a recharging station for the vehicle within a navigable range of the vehicle;
   allocating, at the processing platform, time in the route plan for recharging the vehicle at the recharging station; and
   communicating, at the processing platform, the route plan to the vehicle.

2. The method of claim 1, wherein the step of identifying, at the processing platform, the route plan further comprises:
   identifying, at the processing platform, an intermediate destination for the vehicle;
   identifying, at the processing platform, one or more of the candidate route segments, defining a first portion of the route plan, linking the first location to the intermediate destination;
   identifying, at the processing platform, one or more of the candidate route segments, defining a second portion of the route plan, linking the intermediate destination to the second location; and
   identifying, at the processing platform, a schedule for navigating the first and second portions, wherein the schedule provides for navigating at least the second portion in the second traffic state.

3. The method of claim 2, wherein the step of identifying, at the processing platform, the schedule further comprises:
   identifying, at the processing platform, a first transit time for navigating the first portion of the route plan in the first traffic state;
   allocating, at the processing platform, time for customer activities at the intermediate destination; and
   identifying, at the processing platform, a second transit time for navigating the second portion of the route plan in the second traffic state.

4. The method of claim 2, wherein the step of identifying, at the processing platform, the schedule further comprises:
   identifying, at the processing platform, a threshold transit time for navigation from the first location to the second location;
   identifying, at the processing platform, a first transit time for navigating the first portion of the route plan in the first traffic state;
   identifying, at the processing platform, a second transit time for navigating the second portion of the route plan in the second traffic state;
   calculating, at the processing platform, a sum of the first and second transit times; and
   allocating, at the processing platform, time for customer activities at the intermediate destination, if the sum of the first and second transit times does not exceed the threshold transit time.

5. The method of claim 4, wherein the step of allocating, at the processing platform, the time for customer activities further comprises allocating, at the processing platform, a time period no greater than the threshold transit time minus the sum of the first and second transit times.

6. The method of claim 1, wherein the speed metrics further comprise an average transit speed.

7. The method of claim 1, wherein the navigable range is determined by a battery charge status of the vehicle.

8. The method of claim 1, wherein the second traffic state is less congested than the first traffic state.

9. An apparatus for a vehicle navigation system comprising:
- one or more processing devices; and
- a non-transitory computer readable storage device with computer executable instructions stored thereon that, when executed by the one or more processing devices, causes the one or more processing devices to:
  - receive a request for a route plan from a vehicle operably connected to the vehicle navigation system;
  - identify a plurality of candidate route segments for the vehicle;
  - obtain speed metrics associated with the plurality of candidate route segments corresponding to a first traffic state and a second traffic state, wherein the speed metrics are stored and include speed limits and projected transit times associated with the plurality of candidate route segments, and wherein the second traffic state is a prospective state occurring after the first traffic state;
  - identify the route plan for the vehicle, the route plan defining a route from a first location to a second location comprising one or more selected segments of the plurality of candidate route segments, the route plan further defining a schedule for navigating the selected segments, wherein the schedule provides for navigating at least a portion of the selected segments in the second traffic state based on time efficiencies realized from the speed metrics of the second traffic state relative to the first traffic state;
  - identify a route segment that identifies a recharging station for the vehicle within a navigable range of the vehicle;
  - allocate time in the route plan for recharging the vehicle at the recharging station; and
  - communicate the route plan to the vehicle.

10. The apparatus of claim 9, wherein coincident to identifying the route plan the one or more processing devices are configured to:
- identify an intermediate destination for the vehicle;
- identify one or more of the candidate route segments, defining a first portion of the route plan, linking the first location to the intermediate destination;
- identify one or more of the candidate route segments, defining a second portion of the route plan, linking the intermediate destination to the second location; and
- identify a schedule for navigating the first and second portions, wherein the schedule provides for navigating at least the second portion in the second traffic state.

11. The apparatus of claim 10, wherein coincident to identifying the schedule the one or more processing devices are configured to:
- identify a first transit time for navigating the first portion of the route plan in the first traffic state;
- allocate time for customer activities at the intermediate destination; and
- identify a second transit time for navigating the second portion of the route plan in the second traffic state.

12. The apparatus of claim 10, wherein coincident to identifying the schedule the one or more processing devices are configured to:
- identify a threshold transit time for navigation from the first location to the second location;
- identify a first transit time for navigating the first portion of the route plan in the first traffic state;
- identify a second transit time for navigating the second portion of the route plan in the second traffic state;
- calculate a sum of the first and second transit times; and
- allocate time for customer activities at the intermediate destination, if the sum of the first and second transit times does not exceed the threshold transit time.

* * * * *